US 6,654,617 B1

(12) United States Patent
Angus et al.

(10) Patent No.: US 6,654,617 B1
(45) Date of Patent: *Nov. 25, 2003

(54) ANTENNA SYSTEM FOR NARROWBAND COMMUNICATIONS SYSTEMS AND METHOD OF OPERATION

(75) Inventors: Allan D. Angus, Bedford, TX (US); Graham K. Jones, Carrollton, TX (US); Selwyn Hill, Dallas, TX (US)

(73) Assignee: WebLink Wireless, Inc., Dallas, TX (US)

( * ) Notice: Subject to any disclaimer, the term of this patent is extended or adjusted under 35 U.S.C. 154(b) by 97 days.

This patent is subject to a terminal disclaimer.

(21) Appl. No.: 09/629,233

(22) Filed: Jul. 31, 2000

Related U.S. Application Data

(63) Continuation of application No. 09/002,191, filed on Dec. 31, 1997, now Pat. No. 6,097,970.
(51) Int. Cl.[7] .................................................. H04Q 7/20
(52) U.S. Cl. ...................... 455/562; 455/466; 455/503
(58) Field of Search ................................ 455/562, 466, 455/503, 67.3, 561

(56) References Cited

U.S. PATENT DOCUMENTS

| | | | | | |
|---|---|---|---|---|---|
| 5,603,089 A | * | 2/1997 | Searle et al. | ............... | 455/53.1 |
| 5,615,409 A | * | 3/1997 | Forssen et al. | ............ | 455/33.1 |
| 5,745,858 A | * | 4/1998 | Sato et al. | ................... | 455/562 |
| 5,798,675 A | * | 8/1998 | Drach | ......................... | 333/161 |
| 5,839,071 A | * | 11/1998 | Johnson | ...................... | 455/440 |
| 5,901,355 A | * | 5/1999 | Doner | ........................ | 455/447 |

* cited by examiner

Primary Examiner—Daniel Hunter
Assistant Examiner—Thuan T. Nguyen

(57) ABSTRACT

There is disclosed an improved base station for communicating with communication units in a wireless messaging system. According to an advantageous embodiment, the base station comprises: 1) a transmitter that is capable of transmitting messages to the communication units in a forward-channel having a first frequency range; 2) a receiver that is capable of receiving messages from the communication units in a reverse-channel having a second frequency range; and 3) an antenna that is capable of transmitting the forward-channel messages at a first angle of electrical downtilt below the horizon and receiving the reverse-channel messages at a second angle of electrical downtilt, wherein the second angle of electrical downtilt is less than the first angle of electrical downtilt.

44 Claims, 6 Drawing Sheets

ANTENNA SYSTEM FOR NARROWBAND COMMUNICATIONS SYSTEMS AND METHOD OF OPERATION

CROSS-REFERENCE TO RELATED APPLICATIONS

This Application is a continuation of prior U.S. application Ser. No. 09/002,191, filed on Dec. 31, 1997 now U.S. Pat. No. 6,097,970, entitled "ANTENNA SYSTEM FOR NARROWBAND COMMUNICATIONS SYSTEMS AND METHOD OF OPERATION," which is also assigned to the assignee of the present invention. The invention disclosed in this application is related to that disclosed in U.S. patent application Ser. No. 09/001,759, also filed on Dec. 31, 1997, entitled "SYSTEM FOR SCHEDULING REVERSE-CHANNEL MESSAGES IN NARROWBAND COMMUNICATIONS SYSTEMS AND METHOD OF OPERATION," which is also assigned to the assignee of the present invention. The disclosures of these related patent applications are incorporated herein by reference for all purposes as if fully set forth herein.

TECHNICAL FIELD OF THE INVENTION

The present invention is directed, in general, to wireless communication systems and methods of operating the same, and, in particular, to narrowband communication systems for one-way and two-way transmission of voice and data messages.

BACKGROUND OF THE INVENTION

The demand for better and cheaper wireless telecommunication services and equipment continues to grow at a rapid pace. Much of this growth is spurred by the Federal Communication Commission's ("FCC") approval of certain frequency bands for the next generation of Personal Communication Service ("PCS") devices that provide voice telephone service as well as advanced voice and/or data message paging services. A relatively small portion of the available spectrum was set aside for narrowband PCS, which is more suited to advanced message paging services, to encourage efficient use of the available spectrum.

There are a number of well-known wireless communication techniques that attempt to maximize the efficiency with which the available spectrum is used. These methods include frequency division multiple access ("FDMA"), time division multiple access ("TDMA"), code division multiple access ("CDMA"), and the like. The term "multiple access" means that multiple, simultaneous users (or "subscribers") are supported in each of these systems.

In an FDMA system, for instance, the total available radio spectrum is divided into separate frequency bands (or "channels") of, for example, 25–30 KHz for those systems based on the "AMPS" or "TACS" standards, or 10 KHz for newer systems, such the narrowband PCS ("NPCS") advanced messaging systems. In FDMA, only one subscriber at a time is assigned to a channel. No other subscriber may access this channel until the transmission of the message sent by the first subscriber is completed.

In a TDMA system, the total available radio spectrum is again divided into separate frequency bands. Each band is then temporally subdivided into, for example, three time slots. Only one subscriber at a time is assigned to each channel, where a channel corresponds to a particular frequency band and a particular time slot for that band. No other subscriber may access this channel until the transmission of the message sent by the first subscriber is completed.

In a CDMA system, the total available radio spectrum is used by each subscriber. Each subscriber transmits a unique, pseudo-random noise ("PN") code sequence as a spread spectrum signal. The subscriber's transmitter and the receiving base station share the code, which is used to distinguish the subscriber from other subscribers in the system, who use different codes PN codes. Thus, a CDMA system uses codes rather than frequency and/or time slots to provide multiple access.

The total capacity of a multiple access system may be further improved by dividing a wireless system into cells and, in the case of FDMA and TDMA, using only different frequency channels in adjoining cells. The organization of message paging and cellular telephone systems into cells is widely known and understood. Division into cells is accomplished by limiting the transmission range of both the base stations and the mobile communication units. The frequencies used in one cell do not interfere with the different frequencies used in the adjoining cells and are not transmitted far enough to interfere with identical frequencies used in more remote, non-adjoining cells. Frequency "reuse" is therefore possible by dividing a TDMA or FDMA system into cells.

In the case of CDMA, division of the system into cells does not affect frequency allocation, since all subscribers use the same amount of spectrum. However, there are less subscribers per cell in smaller cells, so there is less interference to distort the signal transmitted by each subscriber. Thus, capacity is still improved for the overall system.

The structure of a message paging system is somewhat different than cellular telephone systems. In a message paging system, all of the base station transmitters throughout a wide coverage area are synchronized and simultaneously broadcast (i.e., simulcast) a paging message in a forward-channel to a subscriber's pager. This simulcast increases the likelihood that the paging message will reach the pager even through obstacles, such as buildings. The paging system does not assign the subscriber to a cell and transmit to the subscriber only in that cell, as in the case of a cellular telephone system.

However, even in a paging environment, there is a breakdown of the message paging system into cells. That is, due to the low power of a hand-held two-way pager, a message transmitted by a user in a reverse-channel has a very limited range compared to the base station transmitters. Therefore, a relatively large number of base station receivers must be deployed throughout the message paging system coverage area in order to ensure that the signal transmitted by any pager is received by a base station receiver. As a result, minimizing the number of receivers necessary to monitor the coverage area of a message paging system becomes an important consideration. Using less receivers lowers the infrastructure cost and, therefore, lowers the service cost to subscribers.

There exists a need in the art for an improved wireless communication system that minimizes the equipment cost necessary to operate the system. In particular, there is a need for an improved wireless messaging system that minimizes the number of base station receivers required to operate the system. There is a further need in the art for an improved narrowband messaging system capable of providing advanced two-way messaging services that maximizes frequency reuse and spectral efficiency with a minimum number of base station receivers.

SUMMARY OF THE INVENTION

The limitations inherent in the prior art described above are overcome by an improved base station for communicating with mobile communication units (e.g., message pagers, PCS devices, personal data assistant and other processing systems that include wireless communication functionality) in a wireless messaging system. In an advantageous embodiment, the base station includes: 1) a transmitter that is capable of transmitting messages to the communication units in a forward-channel having a first frequency range; 2) a receiver that is capable of receiving messages from the communication units in a reverse-channel having a second frequency range; and 3) an antenna that is capable of transmitting the forward-channel messages at a first angle of electrical downtilt below the horizon and receiving the reverse-channel messages at a second angle of electrical downtilt, wherein the second angle of electrical downtilt is less than the first angle of electrical downtilt.

According to an advantageous embodiment, the first angle of electrical downtilt is determined by the first frequency range and the second angle of electrical downtilt is determined by the second frequency range. As will be discussed in detail herebelow, the downtilt angle of a receive beam is preferably slightly below the horizon. Use of a relatively small angle of electrical downtilt in the reverse-channel allows the antenna to focus on signals from more distant communication units, including those beyond the boundaries of the coverage area in which the base station resides. This tends to increase the probability that the antenna will receive reverse-channel signals from communication units in other coverage areas, thereby increasing the overall macro-diversity of the antenna in the messaging network.

In an alternate embodiment of the present invention, the base station further comprises an amplifier disposed proximate the antenna for amplifying messages received in the reverse-channel prior to processing in the receiver. In a related embodiment, the antenna is a sectored antenna that is operable to transmit a forward-channel message in a selected direction at greater signal strength relative to a signal strength transmitted in a non-selected direction. In another related embodiment, the antenna is a sectored antenna operable to amplify a reverse-channel message received from a selected direction and attenuate a reverse-channel message received from a non-selected direction.

In another alternate embodiment of the present invention, the second angle of electrical downtilt is approximately zero degrees, such that the antenna is optimized to receive reverse-channel messages from remote communication units.

The foregoing SUMMARY OF THE INVENTION outlines, rather broadly, some advantageous features of various embodiments of the present invention so that those of ordinary skill in the art may better understand the DETAILED DESCRIPTION that follows. Additional features of the invention will be described hereafter that form the subject matter of the CLAIMS OF THE INVENTION. Those of ordinary skill in the art should appreciate that they can readily use the disclosed conception and specific embodiments as a basis for designing or modifying other structures for carrying out the same purposes of god the present invention. Those of ordinary skill in the art should also realize that such equivalent constructions do not depart from the spirit and scope of the present invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, be a property of, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, wherein like numbers designate like objects and in which.

DETAILED DESCRIPTION

Figure 1:
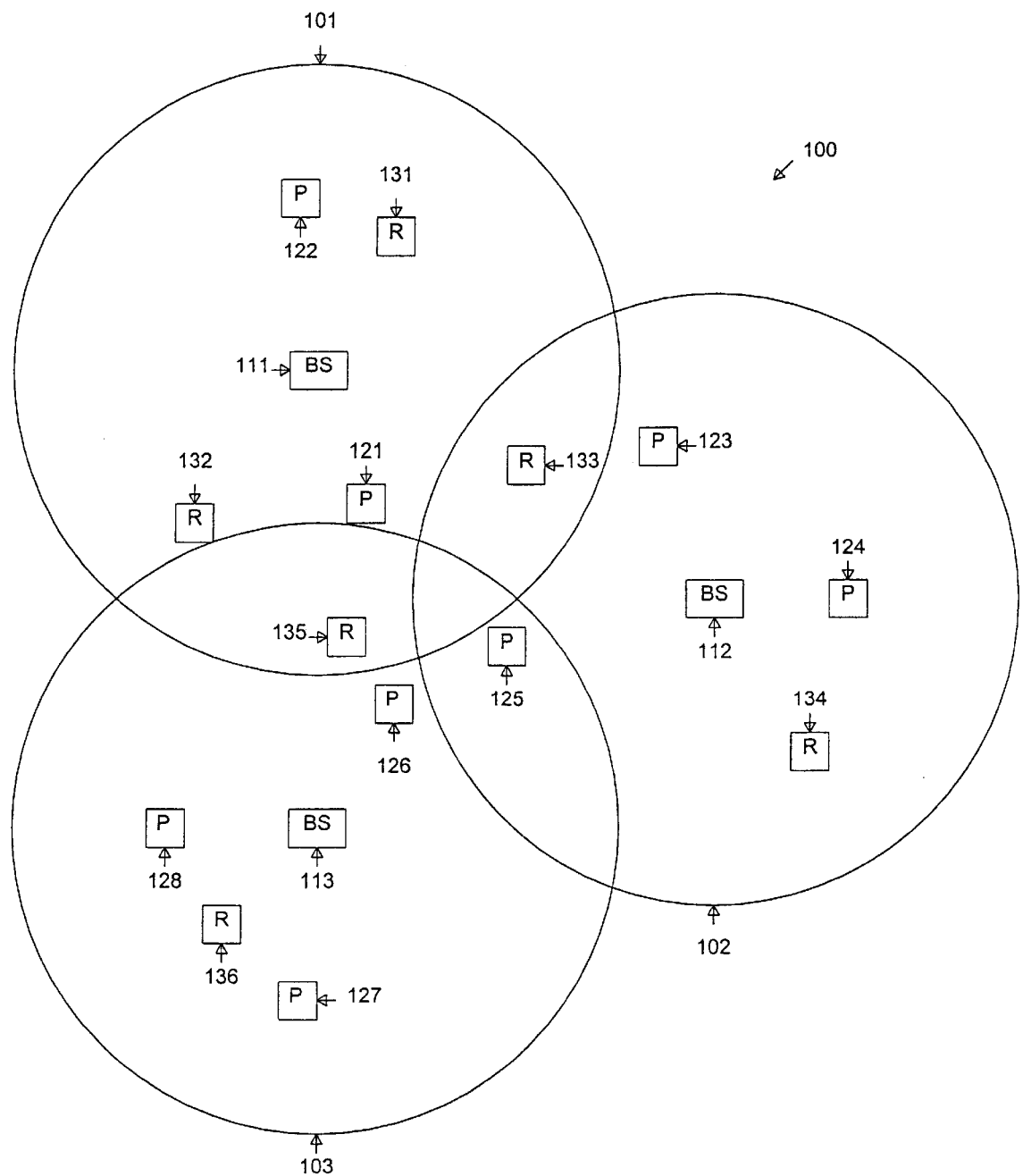
FIG. 1 illustrates a representative portion of a conventional message paging network in accordance with the PRIOR ART.

Turning initially to FIG. 1, illustrated is a representative portion of a conventional message paging network (generally designated 100; hereafter, referred to as "messaging network 100") in accordance with the PRIOR ART. Messaging network 100 may provide, for example, two-way voice and text messages to subscribers. Messaging network 100 is represented by three exemplary fixed land sites, called base stations, for communicating with a plurality of mobile communication units (e.g., message pagers, PCS devices, personal data assistant and other processing systems that include wireless communication functionality, etc.) within messaging network 100. Base stations 111, 112 and 113, each labeled "BS" in FIG. 1, have coverage areas 101, 102, and 103, respectively, that are determined by the power of the transmitters in base stations 111, 112, and 113. For the, purposes of illustration and discussion, coverage areas 101, 102, and 103 are shown as circles. In real world environments, however, each of coverage areas 101, 102, and 103 may differ significantly from an idealized circular form.

For purposes of illustration, a plurality of message paging units, each labeled "P" in FIG. 1, are shown scattered throughout messaging network 100. Paging units 121 and 122 are located within coverage area 101 and may engage in two-way messaging with base station 111. Paging units 123 and 124 are located in coverage area 102 and may engage in two-way messaging with base station 112. Paging units 126, 127 and 128 are located in coverage area 103 and may engage in two-way messaging with base station 113. Paging unit 125 is in coverage areas 102 and 103 and may engage in two-way messaging with base stations 112 and 113.

In a narrowband messaging environment, such as FDMA, base stations 111, 112, and 113 transmit RF signals in a forward-channel, such as from 939–940 MHz, for example. Base stations 111, 112, and 113 receive RF signals in a reverse-channel at, for example, 901–902 MHz. Each base station is effectively a transceiver that contains an RF transmitter and an RF receiver for carrying out two-way communications. Each paging unit receives forward-channel messages directed to it at a selected frequency within the forward-channel. Each paging unit also transmits reverse-channel messages at a selected frequency within the reverse-channel.

Messaging network 100 may be, for example, a two-way wireless messaging system compatible with the MOTOROLA® ReFLEX™ transport protocol. The ReFLEX™ protocol may be used to send a numeric message, such as a conventional 10-digit telephone number, to a paging unit. The paging unit may then transmit in the reverse channel an automatic acknowledgment message that does not require subscriber action. Alternatively, the ReFLEX™ protocol may be used in an enhanced paging mode to send a more complex alphanumeric message, such as an e-mail text message, to the paging unit. The pager may then transmit in the reverse-channel an automatic acknowledgment message that does not require subscriber action. Some time later the subscriber may transmit a "canned" message stored in the paging unit, such as "Will Call You Later", or a unique message composed by the subscriber. Additionally, the paging unit may be enabled to transmit or receive voice messages of short duration recorded by the subscriber or a caller.

Base station 111 transmits data and voice messages to paging units in coverage area 101; base station 112 transmits data and voice messages to paging units in coverage area 102; and base station 113 transmits data and voice messages to paging units in coverage area 103. Base stations 111, 112, and 113 may be connected to one another and to a central control facility (not shown) by a wired backbone, such as a proprietary fiber-optic network. In alternate embodiments, base stations 111, 112, and 113 may be connected to one another and to a central control facility by a satellite communications link, such as through a very small aperture terminal ("VSAT").

Voice and text paging messages may be received into the central control facility from a variety of sources. Some messages may be received from the public telephone system in the form of simple call-back numbers entered by a caller on a DTMF keypad. Alphanumeric messages may be received by the central control facility from an Internet connection. Additionally, voice messages from callers may be received from the public telephone system and recorded for subsequent transmission to the subscriber.

As is well known, the transmit power of a base station is typically much greater than the transmit power of the paging units in each coverage area. In order to maximize the probability of receiving a reverse-channel message from a paging unit, additional receive-only stations, or simply receivers, are frequently disposed throughout messaging network 100 in order to decrease the average distance separating a paging unit from the nearest paging system receiver. The extra receivers thereby minimize the effects of multi-path fading, delay spread, and signal blocking with respect to each paging unit. The receivers are also connected to the base stations and the central control facility by a wired proprietary. data link.

For example, receivers 131 and 132 are located in coverage area 101 and relay messages received in the reverse-channels from any of the paging units in messaging network 100 to the central control facility. Similarly, receivers 133 and 134, located in coverage area 102, receive messages in the reverse-channel from any of the paging units in messaging network 100 and relay the messages to the central control facility. Finally, receivers 135 and 136 in coverage area 103 relay messages received in the reverse-channel to the central control facility.

Because of the plurality of receivers in each coverage area, including any receiver that may be part of the base station, a message transmitted by a paging unit may be received by more than one receiver. Thus, if the signal received by one receiver experiences multi-path fading or is blocked by a structure, such as a building, another receiver can still receive the signal and relay it to the base station for processing.

Receivers are not tied to a particular coverage area. All receivers relay the reverse-channel signal that is received to the central control facility. For example, paging units 125 and 126 are located proximate receiver 135 in coverage area 103. Messages transmitted by paging units 125 and 126 may be received by receiver 135, as well as base stations 112 and 113 in coverage areas 102 and 103, respectively. This built-in redundancy is known as antenna diversity.

Many receiver systems actually comprise a pair of receive paths coupled to two local diverse antenna systems. In such a "micro-diversity" system, both receive paths transfer the received signal energy from a reverse-channel message to the local receiver circuitry at the base station, which then performs error-bit checking to determine if either of the two signals was well-received. If both of the received reverse-channel signals contain errors as a result of fading or obstructions, the receiver circuitry can sum the energies of both of the received signals to form a composite signal. The composite signal may then be error checked to determine the reverse-channel message.

The base stations and receivers in messaging network 100 employ a variety of conventional techniques to prevent interference between the signals transmitted by the base stations and the signals transmitted by the paging units. In a FDMA-based narrowband PCS messaging system, one level of protection is provided by the frequency filtering that separates signals according to their transmission frequency. Messaging network 100 may also employ a sector antenna multiple receiver ("SAMR") that focuses transmitted and received signals. For example, messaging network 100 may employ a SAMR that uses three panel antennas, each of which transmits a full strength signal into a 120 degree sector in the forward-channel, but transmits only an attenuated signal in the remaining 240 degrees of arc. Each panel antenna also amplifies reverse-channel signals received from the 120 degree sector and filters out signals or noise received from the remaining 240 degrees of arc.

Figure 2:
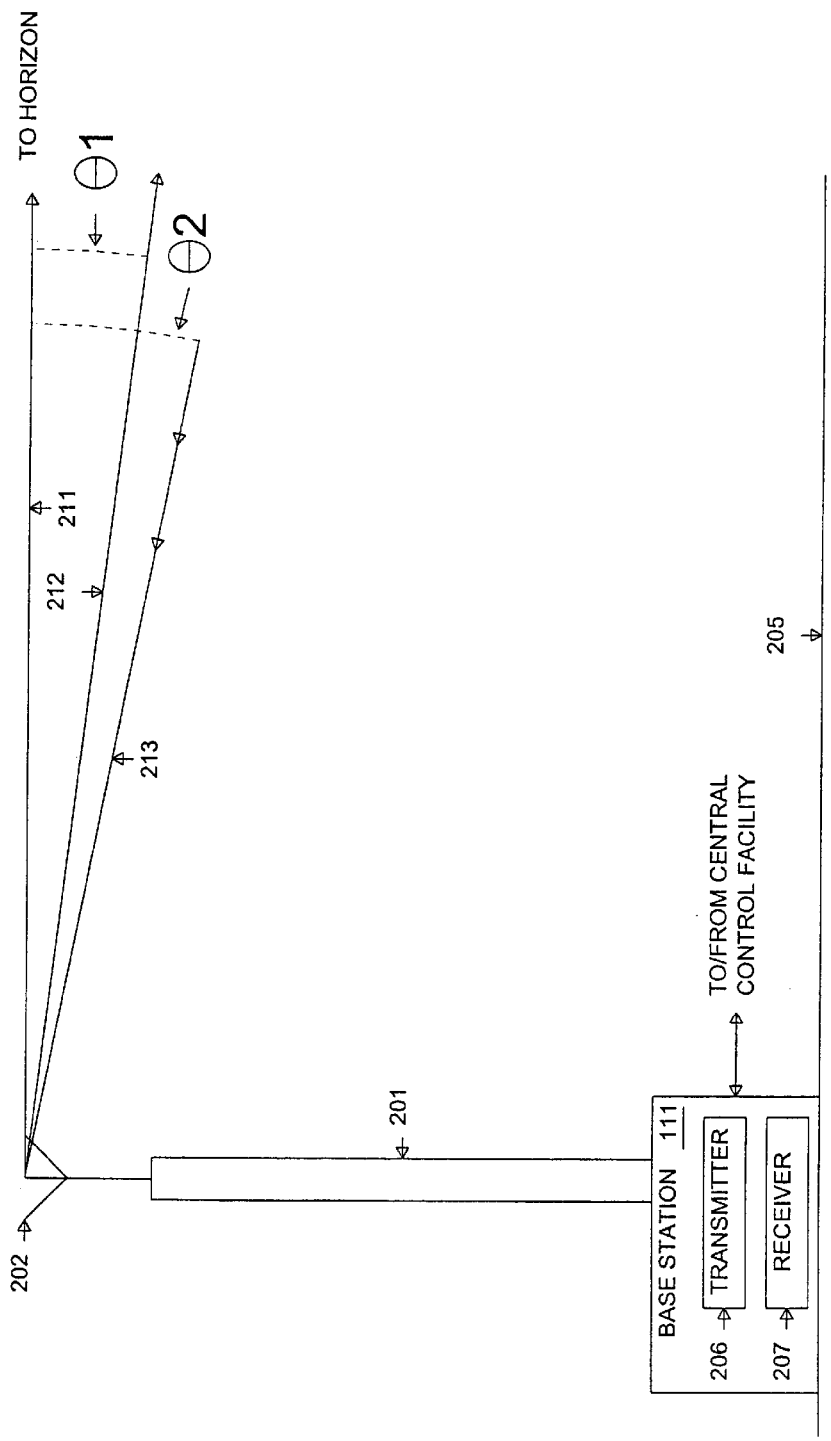
FIG. 2 illustrates conventional forward and reverse-channels associated with a base station antenna using electrical downtilt techniques in accordance with the PRIOR ART.

Prior art paging systems such as messaging network 100 typically employ electrical "downtilt" in the antennas in the base stations and receivers in order to reduce the effective range of transmitted signals and to attenuate signals received from distant paging units or base stations. FIG. 2 illustrates conventional forward and reverse-channels associated with a base station antenna 202 using electrical downtilt techniques in accordance with the PRIOR ART. Although the discussion that follows of PRIOR ART electrical downtilt techniques centers on base station 111, it should be noted that this is by way of illustration only, and that the following discussion applies with equal force to the other base stations and receivers in messaging network 100.

Base station 111 comprises a tower 201 for holding antenna 202 in an elevated position above the ground 205. Base station 111 also comprises a transmitter 206 for transmitting messages in the forward-channel and a receiver 207 for receiving messages in the reverse-channel. The forward and reverse-channel messages are appropriately transferred to or from the central control facility.

Reference beam 211 is a horizontal reference axis indicating the relative position of the horizon. Antenna 202 employs electrical downtilt to transmit messages in the forward-channel along a transmit beam 212. Transmit beam 212 represents the direction of travel with respect to the horizon of the main power lobe transmitted by antenna 202. As FIG. 2 indicates, transmit beam 212 is transmitted below the horizon at a downtilt angle, $\theta 1$. The downtilt angle $\theta 1$ is determined by the electrical characteristics of antenna 202 and is dependent on the transmission frequency of the forward-channel.

Antenna 202 employs electrical downtilt to receive messages in the reverse-channel along a receive beam 213. Receive beam 213 represents the direction of travel with respect to the horizon of an incident signal transmitted from a paging unit located at an optimum distance away from antenna 202. Antenna 202 has been optimized to amplify signals received from paging units at the optimum distance. The downtilt angle, $\theta 2$, of receive beam 213 is below the horizon and is also below the downtilt angle, $\theta 1$, of the transmit beam 212.

The primary purpose in employing electrical downtilt in transmit beam 212 is to restrict the size of the coverage areas 101, 102 and 103 in paging network 100. If transmit beam 212 were oriented directly towards the horizon with no electrical downtilt, much of the energy of the signal transmitted by antenna 202 would be transmitted out to infinity, and therefore lost. Furthermore, employing only a small angle of electrical downtilt would direct the main power lobe of transmit beam 212 towards very distant paging units in other coverage areas-resulting in a weak forward-channel messages being received in the distant paging units.

Electrical downtilt in the forward-channel sends a stronger signal to relatively near paging units located at the optimum distance from antenna 202 (closer to the perimeter of the coverage area), while minimizing the interfering forward-channel signal sent to relatively remote paging units. Similarly, employing electrical downtilt in receive beam 213 enables antenna 202 to amplify reverse-channel signals from nearby paging units, while attenuating reverse-channel signals from more distant paging units.

Because the downtilt angle, $\theta 2$, of receive beam 213 is below the downtilt angle, $\theta 1$, of the transmit beam 212, antenna 202 is optimized to receive reverse-channel signals that-are less distant than the paging units targeted by the transmit beam 212. It would appear that base station 111 may be able to send messages in the forward-channel to paging units from which it cannot receive messages in the reverse-channel. However, it must be remembered that the receiver circuitry in the base station 111 is far more sensitive than the receiver circuitry in the paging units and that coverage area 101 also contains a plurality of receive-only stations, including receivers 131 and 132, that also receive reverse-channel signals. The number and positions of the receivers in messaging network 100 is selected to ensure sufficient overlap of receiver coverage areas. A signal from any paging unit in messaging network 100 is therefore fairly assured of being received by two or three nearby receivers.

The electrical downtilt and antenna diversity techniques described above in connection with messaging network 100 are costly in terms of hardware. A large number of receivers are required to provide effective reverse-channel coverage throughout messaging network 100. The present invention provides an improved messaging network that implements a much lower ratio of receivers to transmitters across the messaging network.

Figure 3:
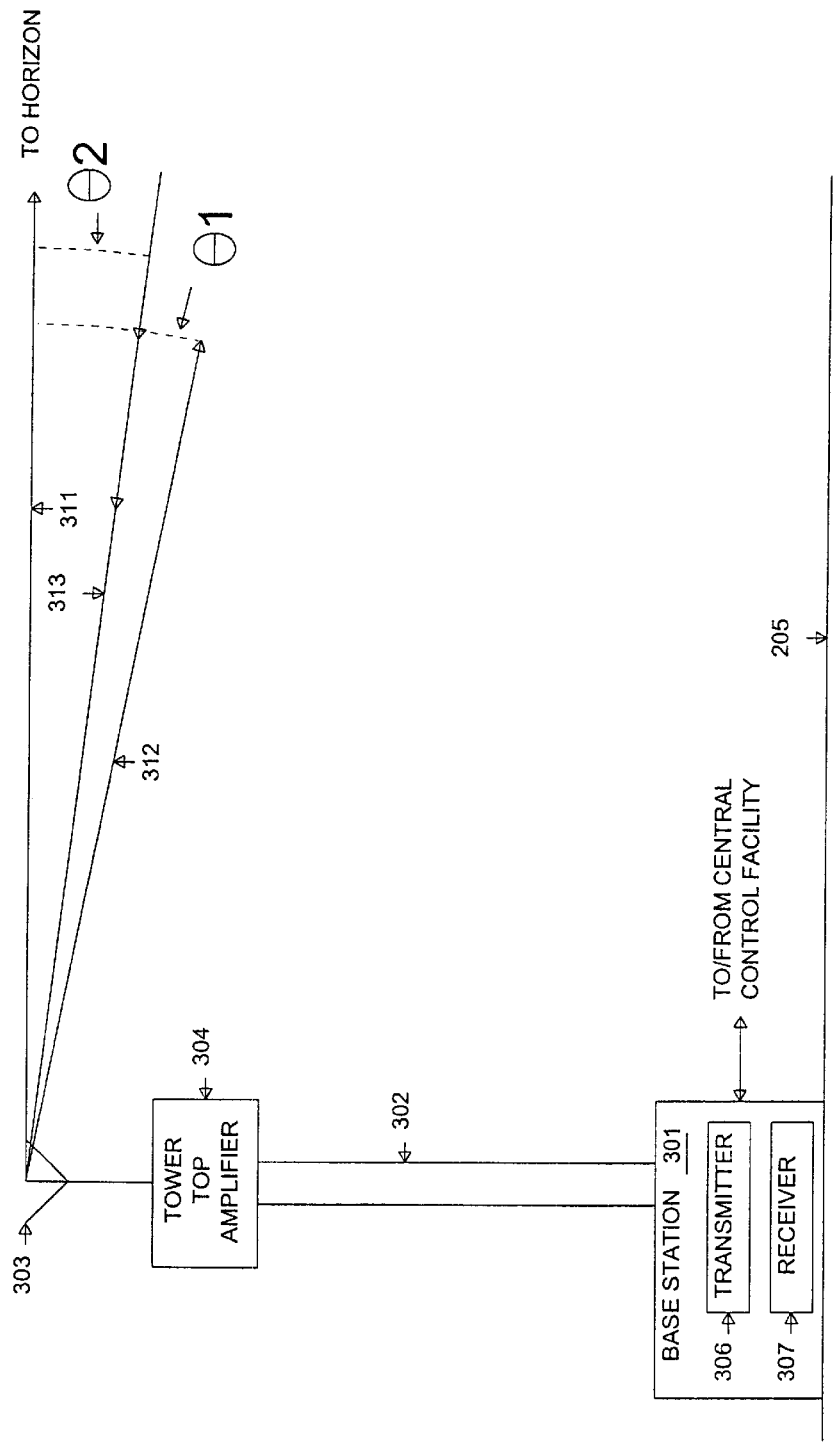
FIG. 3 illustrates forward and reverse-channels associated with a base station in accordance with an exemplary embodiment of the present invention.

Turning now to FIG. 3, illustrated are forward and reverse-channels associated with a base station 301 in accordance with an exemplary embodiment of the present invention. The base station 301 comprises a tower 302 for holding an antenna 303 in an elevated position above ground 205. The base station 301 also comprises a transmitter 306 for transmitting messages in the forward-channel and a receiver 307 for receiving messages in the reverse-channel. The forward and reverse-channel messages are appropriately transferred to or from the central control facility (not shown). A tower-top amplifier 304 may optionally be included to strengthen received signals at the antenna 303 before relaying the received signals to the receiver 307, in order to compensate for line losses occurring on long cables between the antenna and the receiver.

Although the remainder of the discussion of the exemplary embodiment focuses on base station 301, it should be noted that this is by way of illustration only, and that the following discussion applies with equal force to the other base stations and receivers in the improved messaging network.

Reference beam 311 is a horizontal reference axis indicating the relative position of the horizon. Antenna 303 employs electrical downtilt to transmit messages in the forward-channel along a transmit beam 312. Transmit beam 312 represents the direction of travel with respect to the horizon of the main power lobe transmitted by antenna 303. As FIG. 3 indicates, transmit beam 312 is transmitted below the horizon at a downtilt angle, $\theta 1$. The downtilt angle, $\theta 1$, is determined by the electrical characteristics of antenna 303 and is dependent on the transmission frequency of the forward-channel.

Antenna 303 employs electrical downtilt to receive messages in the reverse-channel along a receive beam 313. Receive beam 313 represents the direction of travel with respect to the horizon of an incident signal transmitted from a paging unit located at an optimum distance away from antenna 303. Antenna 303 has been optimized to amplify signals received from paging units at the optimum distance. The downtilt angle, $\theta 2$, is determined by the electrical characteristics of antenna 303 and is dependent on the transmission frequency of the reverse-channel.

However, unlike the PRIOR ART antenna 202, the downtilt angle, $\theta 2$, of the receive beam 313 is now above the downtilt angle, $\theta 1$, of the transmit beam 312. Furthermore, in a preferred embodiment of the present invention, the downtilt angle, $\theta 2$, of receive beam 313 is only slightly below the horizon. In other embodiments of the present invention, the downtilt angle, θ2, of receive beam 313 may be oriented directly at the horizon. The use of a smaller angle of electrical downtilt in the reverse-channel in antenna 302 focuses antenna 303 on signals from more distant paging units, including those beyond the boundaries of the coverage area in which base station 301 resides. This type of optimization increases the probability that antenna 303 will receive reverse-channel signals from remote paging units in other coverage areas, thereby increasing the overall macro-diversity of the antennas in the paging network.

The present invention optimizes antenna 303 for the amplification of signals from remote paging units, and thereby maximizes antenna macro-diversity effects, under the assumption that, although antenna 303 may occasionally lose the signal from a nearby paging unit due to blocking or multipath fading, at least one other less-close antenna will properly receive the lost paging unit's signal because the less-close antenna has also been optimized to amplify the signal of remote paging units. Maximizing the ability of more remote receivers to receive the paging unit's transmission improves the overall performance of the paging network.

Figure 4:
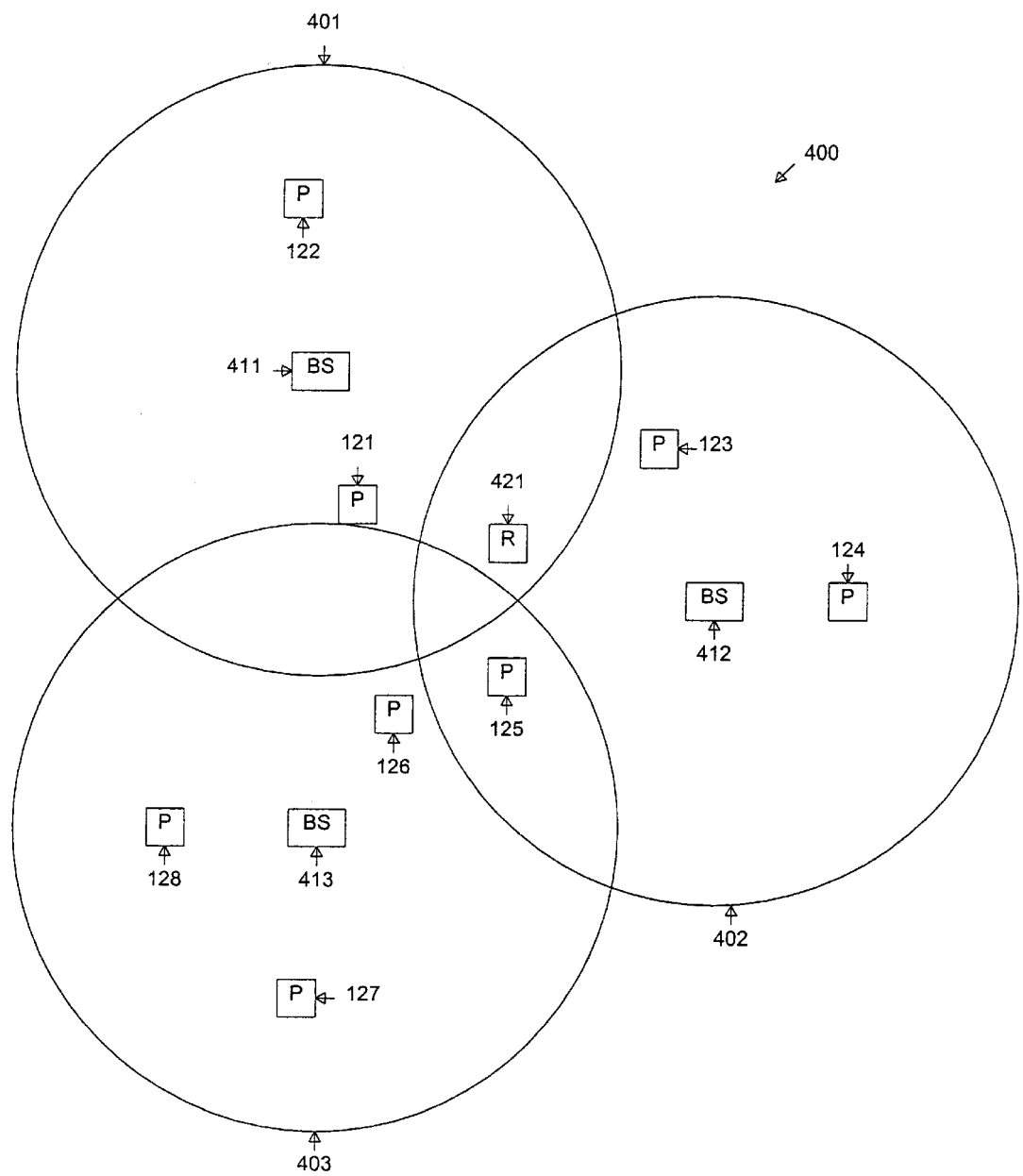
FIG. 4 illustrates an improved messaging network implementing improved base stations and an improved receiver in accordance with an exemplary embodiment of the present invention.

Turning next to FIG. 4, illustrated is an improved messaging network (generally designated 400) implementing improved base stations 411, 412 and 413 and an improved receiver 421 in accordance with an exemplary embodiment of the present invention. Base stations 411, 412 and 413, each labeled "BS" in FIG. 4, have coverage areas 401, 402, and 403, respectively, that are determined by the power of the transmitters in base stations 411, 412, and 413. For the purposes of illustration and discussion, coverage areas 401, 402, and 403 are shown as circles. In real world environments, however, each of coverage areas 401, 402, and 403 may again differ significantly from an idealized circular form.

Each of base stations 411, 412, and 413 communicates with a plurality of paging units generally located within its coverage area. Under ordinary circumstances, base station 411 transmits data and voice messages to paging units in coverage area 401; base station 412 transmits data and voice messages to paging units in coverage area 402; and base station 413 transmits data and voice messages to paging units in coverage area 403. Base stations 411, 412, and 413 are connected to one another and a central control facility (not shown) by a wired backbone, such as a proprietary fiber-optic network or, preferably, by a wireless link, such as a two-way VSAT network.

A plurality of paging units are shown scattered throughout messaging network 400. Paging units 121 and 122 are located within coverage area 401 and may be in two-way communication with at least base station 411. Paging units 123, 124 and 125 are located in coverage area 402 and may be in two-way communication with at least base station 412. Paging units 126, 127 and 128 are located in coverage area 403 and may be in two-way communication with at least base station 413.

As in the PRIOR ART network, each of base stations 411, 412 and 413 transmit data and voice messages in a forward-channel to the paging units within its associated coverage area. Each base station may also receive messages in a reverse-channel from any paging unit in messaging network 400. Each base station is effectively a transceiver that contains an RF transmitter and an RF receiver for carrying out two-way communications. As in the case of the PRIOR ART messaging network 100, the two-way message traffic in messaging network 400 may comprise voice and data messages associated with one of a plurality of information or notification modes, such as numeric and alphanumeric paging and voice messaging. In an advantageous embodiment, messaging network 400 is a FDMA-based narrowband messaging system implementing the MOTOROLA® ReFLEX 25® protocol and employing sector antenna multiple receiver ("SAMR") systems that focus transmitted signals in the forward-channel and amplify received signals in the reverse-channel.

Messaging network 400 also comprises an additional receive-only station to receive messages in the reverse-channel. The receive-only station, receiver 421, is connected to the base stations and a central control facility (not shown) by a wired backbone, such as a proprietary fiber-optic network. It can now be seen, however, that the total number of receivers required by messaging network 400, including the receivers in base stations 401, 402, and 403, is much less than in the PRIOR ART messaging network 100. This is due to the macro-diversity effect gained across the entirety of messaging network 400 by optimizing the electrical downtilt of the antennas in improved base stations 411, 412 and 413 and in improved receiver 421 according to the exemplary antenna system described in FIG. 3.

Figure 5:
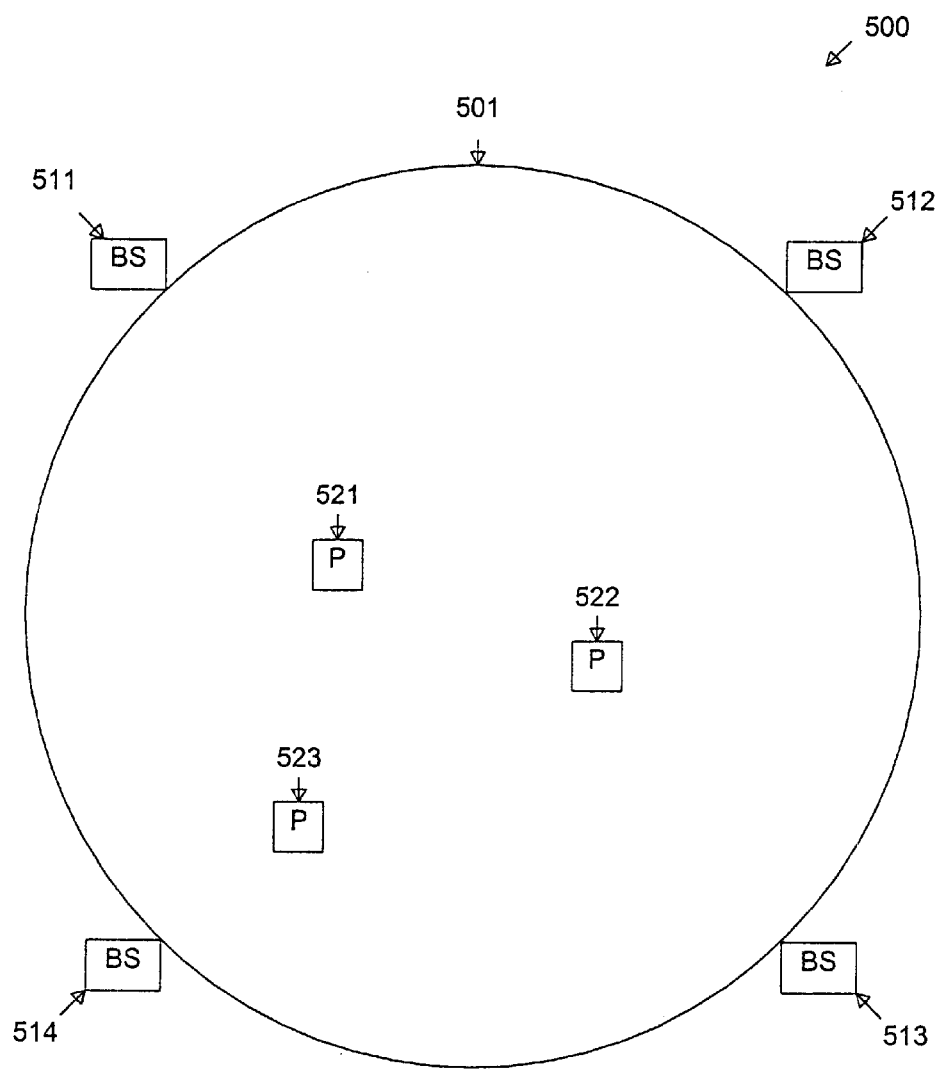
FIG. 5 illustrates an improved messaging network implementing improved base stations in accordance with a second exemplary embodiment of the present invention.

Turning next to FIG. 5, illustrated is an improved messaging network 500 implementing improved base stations 511–514 in accordance with a second exemplary embodiment of the present invention. The electrical downtilt of each of the antennas in improved base stations 511–514 is also optimized according to the antenna system described in FIG. 3. The exemplary messaging network 500 is optimized for use in a heavy urban area. The outline of a large cluster of office buildings or a dense metropolitan area is denoted by perimeter 501.

Base stations 511–514 are located around perimeter 501. Receive-only stations optimized in accordance with the antenna system described in FIG. 3 may also be implemented within the urban core, if the density of paging receivers and the number of signal-blocking obstacles so requires. Paging units 521, 522 and 523 are located in the dense urban area and may be in two-way communication with at least one of base stations 511–514. In the forward-channel, base stations 511–514 transmit messages into the dense urban area and take advantage of reflections off buildings to ensure that the forward-channel signal reaches the intended paging unit. Similarly, in the reverse-channel, base stations 511–514 can receive signals reflected off buildings to ensure that at least one of the base stations receives a reverse-channel message transmitted by any one of the paging units 521, 522, and 523.

Figure 6:
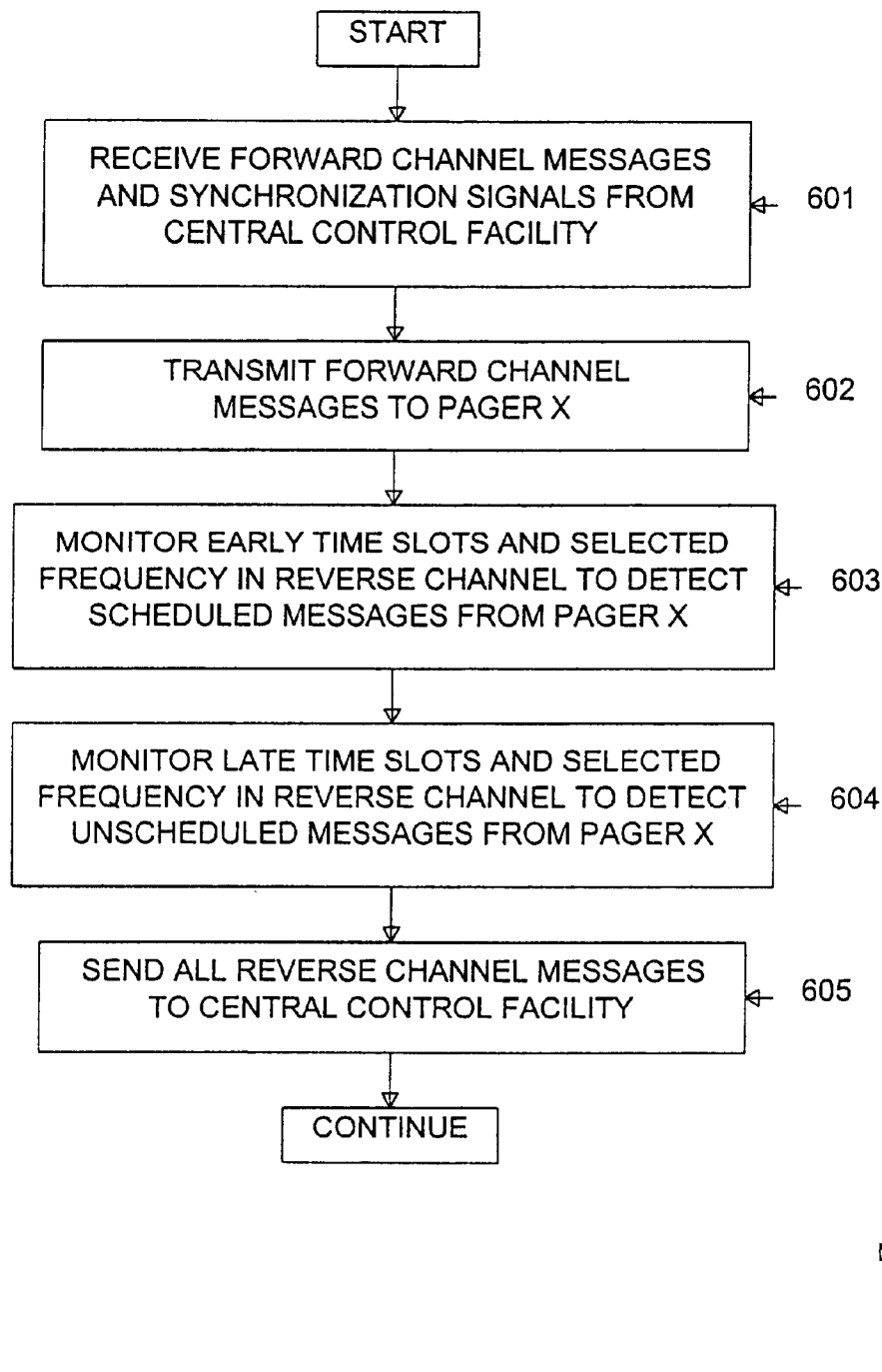
FIG. 6 illustrates a flow diagram of an exemplary method for operating the improved base station of FIGS. 3 to 5 in accordance with the principles of the present invention.

Turning lastly to FIG. 6, a flow diagram of an exemplary method (generally designated 600) for operating the improved base station 411 in accordance with the principles of the present invention. For the purpose of illustration, messaging network 400 is assumed to be, for example, a two-way wireless messaging system compatible with the MOTOROLA® ReFLEX™ transport protocol. In a normal operating mode, base station 411 continually receives from the central control facility forward-channel messages to be broadcast (or simulcast) to paging units in messaging network 400 and synchronization signals which synchronize the simultaneous transmission of the forward-channel messages to the appropriate pagers (process step 601). In the illustrated example, base station 411 receives a message that is to be transmitted in the forward-channel to Pager X.

Next, at the designated time, the transmitter 306 in base station 411 transmits the queued forward-channel messages to each pager, including the forward-channel message to Pager X (process step 602). All of the forward-channel messages are transmitted by all of the base stations at an electrical downtilt angle of θ1. This simulcast of each message page by every base station in messaging network 400 maximizes the probability that each paging message reaches the targeted paging unit. The forward-channel message also includes information telling a receiving paging unit, such as Pager X, the reverse-channel time slot and frequency in which the receiving pager should transmit any scheduled messages, such as the automatic acknowledgment message each paging unit sends upon receipt of the forward-channel message.

In the reverse-channel, the receiver 307 in base station 411 monitors the early time slots 0–17 and selected frequency in each reverse-channel frame to detect the automatic acknowledgment message that Pager X is scheduled to send back upon receipt of the forward-channel message (process step 603). The receiver antenna is optimized at an electrical downtilt angle of θ2 to receive the reverse-channel messages transmitted by relatively remote paging units in the messaging network 400. Next, the receiver 307 in base station 411 monitors the late time slots 18–22 and selected frequency in each reverse-channel frame to detect unscheduled messages from Pager X (process step 604). An unscheduled reverse-channel message may include the registration request generated by a paging unit when it is first powered on and identifies itself to messaging network 400. Alternatively, an unscheduled reverse-channel message may include an Inbound Message Request whereby Pager X informs messaging network 400 that the subscriber wishes to send a voice or alphanumeric message that subscriber has composed.

Next, base station 411 sends all reverse-channel messages to the central control facility for further processing (process step 605). At this point, the base station 411 may repeat the process described above from the start.

As is apparent from the foregoing, the principles of the present invention are particularly beneficial when applied to wireless communication networks that employ simulcast messaging. Those skilled. in the art should understand that although message pager have been used to illustrate the principles of the present invention, alternate communication units (or devices) may suitably be used with a messaging system in accordance with the principles of the present invention. For instance, PCS devices, as well as suitably arranged calculators; palmtop, laptop, notebook, personal or other computers; and any other like processing systems, including PDAs (i.e., devices, or "gadgets," that perform particular tasks, such as a diary, database, PCS, message paging, multimedia player, memo-taker, calculator, alarm clock, etc.).

Although the principles of the present invention have been described in detail with reference to message paging system and infrastructure embodiments, those of ordinary skill in the art should understand that they can make various changes, substitutions and alterations herein without departing from the spirit and scope of the invention in its broadest form.

What is claimed is:

1. For use in a wireless messaging system, a base station that communicates with communication units located in said wireless messaging system, said base station comprising:
a transmitter that transmits messages to said communication units in a forward-channel;
a receiver that receives messages from said communication units in a reverse-channel; and
an antenna that transmits said forward-channel messages at a first angle of electrical downtilt below horizon and receives said reverse-channel messages at a second angle of electrical downtilt, wherein said second angle of electrical downtilt is less than said first angle of electrical downtilt and said antenna is a sectored antenna that is operable to transmit a forward-channel message in a selected direction at greater signal strength relative to a signal strength transmitted in a non-selected direction.

2. The base station set forth in claim 1 wherein said sectored antenna is further operable to amplify a reverse-channel message received from a selected direction and attenuate a reverse-channel message received from a non-selected direction.

3. The base station set forth in claim 1 wherein said first angle of electrical downtilt is determined by a first frequency range.

4. The base station set forth in claim 1 wherein said second angle of electrical downtilt is determined by a second frequency range.

5. The base station set forth in claim 1 further comprising an amplifier disposed proximate said antenna that is capable of amplifying messages received in said reverse-channel prior to processing in said receiver.

6. The base station set forth in claim 1 wherein said second angle of electrical downtilt is approximately zero degees, such that said antenna is optimized to receive reverse-channel messages from remote communication units.

7. A wireless messaging system that communicates with communication units comprising:
a plurality of transmitter stations wherein at least ones of said plurality of transmitter stations comprises:
a transmitter that transmits messages to said communication units in a forward-channel;
a receiver that receives messages from said communication units in a reverse-channel; and
antenna means for transmitting said forward-channel messages at a first angle of electrical downtilt below horizon and receiving said reverse-channel messages at a second angle of electrical downtilt, wherein said second angle of electrical downtilt is less than said first angle of electrical downtilt.

8. The wireless messaging system set forth in claim 7 wherein said antenna means is a sectored antenna that is operable to transmit a forward-channel message in a selected direction at greater signal strength relative to a signal strength transmitted in a non-selected direction.

9. The wireless messaging system set forth in claim 8 wherein said sectored antenna is further operable to amplify a reverse-channel message received from a selected direction and attenuate a reverse-channel message received from a non-selected direction.

10. The wireless messaging system set forth in claim 7 wherein said first angle of electrical downtilt is determined by a first frequency range.

11. The wireless messaging system set forth in claim 7 wherein said second angle of electrical downtilt is determined by a second frequency range.

12. The wireless messaging system set forth in claim 7 further comprising an amplifier disposed proximate said antenna that is capable of amplifying messages received in said reverse-channel prior to processing in said receiver.

13. The wireless messaging system set forth in claim 7 wherein said second angle of electrical downtilt is approximately zero degrees, such that said antenna is optimized to receive reverse-channel messages from remote communication units.

14. A method of operating a wireless messaging system to communicate messages with communication units located in said wireless messaging system, said method comprising the steps of:

transmitting messages to the communication units in a forward-channel and at a first angle of electrical downtilt below horizon;

receiving messages from the communication units in a reverse-channel and at a second angle of electrical downtilt, wherein the second angle of electrical downtilt is less than the first angle of electrical downtilt; and amplifying a reverse-channel message received from a selected direction and attenuating a reverse-channel message received from a non-selected direction.

15. The method set forth in claim 14 wherein the first angle of electrical downtilt is determined by a first frequency range.

16. The method set forth in claim 14 wherein the second angle of electrical downtilt is determined by a second frequency range.

17. The method set forth in claim 14 wherein the step of transmitting further includes the step of transmitting forward-channel messages in a selected direction at greater signal strength than forward-channel messages transmitted in a non-selected direction.

18. A wireless communication system that includes a plurality of associated base stations operable to simulcast messages to communication units in a forward-channel and to receive messages from ones of said communication units in a reverse-channel, said forward-channel messages simulcast at a first angle of electrical downtilt and said reverse-channel messages received at a second angle of electrical downtilt, said second angle of electrical downtilt being less than said first angle of electrical downtilt, and wherein at least one of said base stations includes a sectored antenna that transmits a forward-channel message in a selected direction at greater signal strength relative to a signal strength transmitted in a non-selected direction.

19. The wireless communication system set forth in claim 18 wherein said sectored antenna is operable to amplify a reverse-channel message received from a selected direction and attenuate a reverse-channel message received from a non-selected direction.

20. The wireless communication system set forth in claim 18 wherein said first angle of electrical downtilt is determined by a first frequency range.

21. The wireless communication system set forth in claim 18 wherein said second angle of electrical downtilt is determined by a second frequency range.

22. The wireless communication system set forth in claim 18 wherein one of said base stations includes an amplifier that amplifies messages received in said reverse-channel.

23. The wireless communication system set forth in claim 18 wherein said second angle of electrical downtilt is approximately zero degrees, such that an antenna is optimized to receive reverse-channel messages from remote communication units.

24. The wireless communication system set forth in claim 18 wherein said base stations are associated with a perimeter of an urban area.

25. A method of operating a wireless communication system that includes a plurality of associated base stations capable of simulcasting messages to communication units in a forward-channel and receiving messages from ones of said communication units in a reverse-channel, said method comprising the cooperative steps of:

simulcasting said forward-channel messages at a first angle of electrical downtilt;

receiving said reverse-channel messages at a second angle of electrical downtilt, wherein said second angle of electrical downtilt being less than said first angle of electrical downtilt; and using a sectored antenna to transmit a forward-channel message in a selected direction at greater signal strength relative to a signal strength transmitted in a non-selected direction.

26. The method of operation set forth in claim 25 further comprising the step of further amplifying a reverse-channel message received from a selected direction and attenuating a reverse-channel message received from a non-selected direction.

27. The method of operation set forth in claim 20 wherein said first angle of electrical downtilt is determined by a first frequency range.

28. The method of operation set forth in claim 27 wherein said second angle of electrical downtilt is determined by a second frequency range.

29. The method of operation set forth in claim 27 further comprising the step of amplifying messages received in said reverse-channel.

30. The method of operation set forth in claim 27 wherein said second angle of electrical downtilt is approximately zero degrees, such that an antenna is optimized to receive reverse-channel messages from remote communication units.

31. The method of operation set forth in claim 27 further comprising the step of associating said base stations with a perimeter of an urban area.

32. For use in a base station that communicates with communication units located of a wireless messaging system, an antenna that transmits forward-channel messages at a first angle of electrical downtilt below horizon and receives reverse-channel messages at a second angle of electrical downtilt, wherein said second angle of electrical downtilt is less than said first angle of electrical downtilt and said antenna is a sectored antenna that is operable to transmit a forward-channel message in a selected direction at greater signal strength relative to a signal strength transmitted in a non-selected direction.

33. The antenna set forth in claim 32 wherein said base station comprises (i) a transmitter that transmits messages to said communication units in a forward-channel, and (ii) a receiver that receives messages from said communication units in a reverse-channel.

34. The antenna set forth in claim 33 further comprising an amplifier that is capable of amplifying messages received in said reverse-channel prior to processing in said receiver.

35. The antenna set forth in claim 32 is further operable to amplify a reverse-channel message received from a selected direction and attenuate a reverse-channel message received from a non-selected direction.

36. The antenna set forth in claim 33 wherein said first angle of electrical downtilt is determined by a first frequency range.

37. The antenna set forth in claim 36 wherein said second angle of electrical downtilt is determined by a second frequency range.

38. The antenna set forth in claim 32 wherein said second angle of electrical downtilt is optimized to receive reverse-channel messages from remote communication units.

39. A method of operating a sectored antenna for use in a base station that communicates with communication units located of a wireless messaging system, said sectored antenna operable to (i) transmit forward-channel messages at a first angle of electrical downtilt below horizon and (ii)

receive reverse-channel messages at a second angle of electrical downtilt, said second angle of electrical downtilt is less than said first angle of electrical downtilt, said method of operating said sectored antenna comprising the step of transmitting a forward-channel message in a selected direction at greater signal strength relative to a signal strength transmitted in a non-selected direction.

40. The method of operating said sectored antenna set forth in claim 39 wherein said base station comprises (i) a transmitter that transmits messages to said communication units in a forward-channel, and (ii) a receiver that receives messages from said communication units in a reverse-channel, and said method of operating said sectored antenna further comprises the step of amplifying messages received in said reverse-channel prior to processing in said receiver.

41. The method of operating said antenna set forth in claim 39 further comprising the steps of:

amplifying a reverse-channel message received from a selected direction; and attenuating a reverse-channel message received from a non-selected direction.

42. The method of operating said antenna set forth in claim 39 further comprising the step of determining said first angle of electrical downtilt by a first frequency range.

43. The method of operating said antenna set forth in claim 42 further comprising the step of determining said second angle of electrical downtilt by a second frequency range.

44. The method of operating said antenna set forth in claim 39 further comprising the step of optimizing said second angle of electrical downtilt to receive reverse-channel messages from remote communication units.

* * * * *